3,527,826
CATALYST FOR THE DISPROPORTIONATION OF TOLUENE
Takeshi Sonoda and Masaki Sato, Kamakura-shi, Japan, assignors to Toyo Rayon Kabushiki Kaisha, Tokyo, Japan, a corporation of Japan
No Drawing. Filed May 19, 1969, Ser. No. 825,921
Claims priority, application Japan, May 27, 1968, 43/35,612
Int. Cl. B01j *11/40, 11/52;* C07c *3/58*
U.S. Cl. 260—672　　　　　　　　　　　　　　　8 Claims

ABSTRACT OF THE DISCLOSURE

A shaped catalyst for the fixed bed disproportionation of toluene consisting essentially of the binary mixture of not more than 55% by weight based on the total catalyst of hydrogenated synthetic mordenite and at least 45% by weight based on the total catalyst of hydrogenated natural mordenite, wherein the degree of dealkalization of each of said two mordenites is at least 50 mol percent and the mordenite structure content determined by the intensity of X-ray diffraction peak of specific Bragg's reflection angle is at least 60% by weight.

---

This invention relates to a catalyst which is used in the disproportionation reaction wherein benzene and xylene are synthesized from toluene.

Lately, in concomitance with an increase in the production of principally the polyester and polyamide synthetic fibers, the demand for xylene and benzene, the respective starting materials of these fibers has increased tremendously, with the consequence that the so-called disproportionation method by which toluene, which possesses relatively low utilizable value, is converted to benzene and xylene, has become of increasing importance commercially. Various methods of carrying out the disproportionation of toluene have been investigated heretofore. While most of these methods are those which use the Friedel-Crafts catalyst, others which use a so-called solid acid such as silica-alumina, alumina-boria, or crystalline zeolite known as a molecular sieve have also been reported. And as one of these catalysts for the disproportionation of toluene, the hydrogenated synthetic mordenite obtained by the substitution of hydrogen ions for the alkali metal ions of a synthetic mordenite of the sodium salt type, one class of the crystalline zeolites, by the dealkalizing treatment (e.g., a product of Norton Company, U.S.A., sold by the trade name of "Zeolon-H"), is known as a catalyst possessing high catalytic activity. However, since this hydrogenated synthetic mordenite is in the form of a fine powder and moreover is very friable, it possesses the shortcoming that, when used alone, it cannot be molded into tablet form suitable for use in the usual fixed bed method. The disproportionation of toluene is usually carried out by bringing the toluene into contact with the catalyst layer in the vapor phase, and in this case the catalyst layer is desirable to be a so-called fixed bed. Now, if the catalyst is of powdered form, there is the drawback that frequent stoppage of the apparatus is brought about. Hence, it is usually necessary to use a molded catalyst such as that of tablet form. Consequently, the hydrogenated synthetic mordenite cannot be used for the fixed bed. The use of the hydrogenated synthetic mordenite as a fluid bed is conceivable, but in this case the apparatus becomes complicated and of large size and hence it is inevitably a disadvantage when the disproportionation of toluene is to be carried out on a commercial scale.

To improve upon these shortcomings attempts have been made of molding the hydrogenated synthetic mordenite by mixing a suitable binding agent therewith, such, for example, as kaolin, bentonite, alumina, silica, kaolin type clay and bentonite type clay. But it still possessed such serious drawbacks that the molding was still not possible, or that even though the molding was possible the catalytic activity would either decline by the use of these conventional binding agents or there would be a decrease in the catalytic activity with the passage of time.

We found that when a hydrogenated natural mordenite was used as the binding agent of the hydrogenated synthetic mordenite exceedingly good moldability could be obtained without the attendance of any of the foregoing drawbacks and that the activity of the resulting catalyst was high, as well as the decrease in activity with the passage of time was extremely small. It was also found that the occurrence of the cracking reaction in aromatic compounds as side-reaction, which is frequently seen in the case of using the hydrogenated synthetic mordenite alone, can be greatly reduced by the addition of a hydrogenated natural mordenite in accordance with the process of this invention.

According to the present invention, a catalyst for the disproportionation of toluene is provided which is characterized by being made up of not more than 55 weight percent of a hydrogenated synthetic mordenite and at least 45 weight percent of a hydrogenated natural mordenite, the degree of dealkalization of each of hydrogenated synthetic and natural mordenites being at least 50 mol percent and the content of the mordenite structure such as hereinafter defined being at least 60 weight percent.

Mordenite belongs to the zeolite which is a three-dimensional crystalline aluminosilicate. The structure of zeolite is an open three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to 2. The three-dimensional framework is of porous structure in which pores are contained molecules of water and cations such as alkali metal and alkaline earth metal ions, the negative electrovalence of the tetrahedra containing aluminum being balanced by the inclusion of the cations. Of the zeolites possessing the structural characteristics as above defined, mordenite is meant to be that which particularly has a three-dimensional crystalline structure of aluminosilicate as characterized by the $CuK\alpha$ X-ray diffraction peak of Bragg's reflective angle $2\theta = 25.6°$. (This specific crystalline structure will be hereinafter referred to herein and the appended claims as the mordenite structure.) As mordenites, there are those which naturally occur or those which are synthesized artificially. The naturally occurring mordenites are produced in great quantities in regions of the earth, for example, geothermal zones at Nova Scotia in Canada and at Wairakei in New Zealand, and green tuff zones in Japan. On the other hand, the synthetic mordenites can be produced by a number of conventional methods, for example, preferably such methods as are described in A. H. Keough, L. B. Sand, J. Am. Chem. Soc., 83, 3536 (1961), and British Pat. 1,067,461. For example, they can be produced readily by reacting an alkali aluminate with an alkali silicate in a prescribed proportion. Further, as a commercially available product, there is "Na-Zeolon" which is produced by Norton Company, U.S.A. The synthetic mordenite obtained in this manner is in all cases in the form of a powder and, as previously noted, the hydrogenated synthetic mordenite does not possess any moldability whatsoever when used alone.

While there are a number of significant differences between the naturally occurring mordenites and synthetic mordenites with respect to their chemical composition as well as physical properties, a particularly notable difference is that the synthetic mordenite consists substantially of the aforesaid mordenite structure while in the case of the naturally occurring mordenite the content of the crystalline aluminosilicate characterized by the aforesaid mordenite structure is far less, being generally an amount exceeding 20 weight percent, usually 40–70 weight percent, and at most about 80 weight percent. The constituents other than mordenite that are contained in the natural mordenite include such as amorphous aluminosilicate, montmorillonite, quartz, crystobalite and opal, and besides these a small quantity of iron, titanium, manganese and alkaline earth metals.

The content of the mordenite structure was measured herein by an X-ray method such as described below.

Namely, assuming the content of the mordenite structure of synthetic mordenite be 100%, the intensities of CuKα X-ray refraction peaks of the natural and synthetic mordenite at $2\theta = 25.6°$ were measured, and on the assumption that the ratio of the intensities corresponds to the ratio of the contents of the mordenite structure, the conent of the mordenite structure was calculated.

If the natural mordenite is one whose content of the aforesaid mordenite structure is at least 20 weight percent, it is usable in the present invention. However, one whose content of the mordenite structure is at least 40 weight percent is preferably used.

The hydrogenated synthetic mordenite that is used as catalyst in the present invention is one in which the alkali metal contained in the synthetic mordenite has been substituted by hydrogen. The degree of dealkalization must be at least 50 mol percent of said alkali metal. However, from the standpoint of catalytic activity it is preferred that the degree of dealkalization is at least 80 mol percent. The method of dealkalization by the substitution of hydrogen, as disclosed in, for example, U.S. Pat. 3,130,006, is accomplished either by treating said synthetic mordenite with an aqueous solution of mineral acids such as hydrochloric, sulfuric and phosphoric acids, and an aqueous solution of water-soluble organic acids such as formic and acetic acids, or by first substituting ammonium ions for the alkali metal ions by treating with an aqueous solution of a compound containing ammonium ions such as ammonium chloride and ammonium nitrate, and thereafter carrying out the deammonization by a heat treatment. As the treatment for dealkalization, particularly preferred is that by means of an aqueous solution of hydrochloric acid, nitric acid or ammonium chloride. The acid concentration in carrying out the dealkalization treatment is preferably 1–6 N. When using an aqueous solution of the ammonium salt, a concentration of 1–30 weight percent, and particularly 5–15 weight percent, is preferred. The treatment with the dealkalizing solution may be carried out at room temperature, but preferably at 80–100° C. Since the treatment time depends upon the temperature, it cannot be stated unqualifiedly, but 1–6 days is preferred. The dealkalized mordenite obtained by substituting alkali metal ions with ammonium ions is calcined at 450–650° C. in the air to conduct the deammonization. Thus, there is obtained a hydrogenated synthetic mordenite. The calcination is generally performed for 3–24 hours. The degree of dealkalization was measured by analyzing remaining alkali by means of an electron microdrobe X-ray analyzer.

It is desired that these dealkalized synthetic mordenites are further calcined at 450–650° C., preferably 520–580° C. In the case of the dealkalized synthetic mordenite obtained by substitution of alkali metal ions with ammonium ions, this calcination may be conducted during the above mentioned calcination for deammonization. The so obtained hydrogenated synthetic mordenites demonstrate exceedingly highly catalytic activity for the disproportionation of toluene. However, the catalytic activity of such hydrogenated synthetic mordenite declines greatly with the passage of time as compared with the hydrogenated natural mordenite, to which a mention will be given hereinbelow. When the disproportionation of toluene is carried out with the use of such hydrogenated synthetic mordenite alone, cracking of aromatic rings is concurrently caused to occur as side-reaction, resulting in decrease in the yield. In contrast, when a hydrogenated natural mordenite is used, the degree of occurrence of the cracking of aromatic rings is generally about ⅕ to ½ as compared with the case of the hydrogenated synthetic mordenite.

Again, as previously stated, the hydrogenated synthetic mordenite obtained in this manner is in the form of powder and does not possess any moldability whatsoever when molded alone. Hence, it is necessary to use a binding agent for molding it into a catalyst that can be used in a fixed bed. The molding of such catalyst is preferably performed either by dry molding in a tablet machine or wet molding by means of an extruder. When the molding is to be performed by means of a tablet machine, molding is mechanically impossible even though the conventional binding agents such as graphite, aluminum stearate, starch, polyacrylic acid, mineral oil and vegetable oils are added. Further, although molding is possible if the moldability is improved by adding granular alumina gel, silica gel, kaolin, or the like, the drop in catalytic activity is great in such a case. On the other hand, in the case the molding is performed by means of the extruder, molding is possible if the conventional binding agents which can readily become pasty such as alumina gel, silica gel, kaolin and acid clay are added, but the catalytic activity declines and, in addition, the catalytic activity also declines with the passage of time.

However, when a hydrogenated natural mordenite is admixed in accordance with the present invention, the hydrogenated natural mordenite acts as a binding agent of the hydrogenated synthetic mordenite to impart moldability to the latter. Moreover, it serves to sustain the high catalytic activity possessed by the hydrogenated synthetic mordenite over a prolonged period of time.

The manufacture of the hydrogenated natural mordenite to be used in the present invention can be accomplished by application to the natural mordenite the dealkalization treatment by the hydrogen substitution as previously described in the case of the synthetic mordenite. The degree of dealkalization in this case must be such that at least 50 mol percent, and preferably at least 80 mol percent, of the alkali metal contained in the mordenite structure is substituted by hydrogen as in the case with the hydrogenated synthetic mordenite. Further, this dealkalization treatment may also be carried out after the natural mordenite has been mixed with the synthetic mordenite.

The composition of the invention catalyst must be such that the content of the hydrogenated natural mordenite is at least 45 weight percent, and preferably at least 50 weight percent, of the sum total of the hydrogenated synthetic mordenite and the hydrogenated natural mordenite. If the content of the hydrogenated natural mordenite is less than 45 weight percent, the molding of the catalyst into tablet or other forms becomes difficult, with the consequence that the objects of the invention cannot be attained. Further, the mordenite structure must account for at least 60 weight percent of the invention catalyst. If the content of the mordenite structure is less than 60 weight percent, the catalytic activity in the disproportionation reaction is low. A higher content of the mordenite structure results in a higher catalytic activity, and hence, is preferred. However, as it is critical that the content of the hydrogenated natural mordenite should be at least 45 weight percent based on the total catalyst, there should naturally be an upper limit in the content of the mordenite structure. Generally, it is difficult to heighten the content of the mordenite above about 90 weight percent. Although the upper limit of the amount to be added of the hydrogenated natural mordenite is not critical, it generally depends on the mordenite structure content of the hydrogenated natural mordenite or the mordenite structure content desired in the finally obtained catalyst, and is to be suitably decided based on these factors. A catalyst consisting only of a hydrogenated natural mordenite can fall within the present invention, as far as its mordenite structure content is at least 60 weight percent. However, generally speaking, in order to obtain better results it is preferred that the content of the hydrogenated natural mordenite in the catalyst is less than 80 weight percent.

Further, the usual molding lubricants such as graphite, starch, aluminum stearate, and mineral and vegetable oils can be added to the hereinbefore-described invention catalyst in an amount of 0.1–5 weight percent, and by such an addition the molding is made much easier.

Again, if metals, such as silver and copper, or aluminum fluoride are admixed, desirable results are obtainable in that side reactions, particularly the decomposition of the aromatic rings or the carbonaceous deposits are controlled in the disproportionation of toluene. In this case, the metals such as silver or copper are suitably added in an amount of 1–8 weight percent based on the hydrogenated mordenites, 10–40 weight percent being appropriate in the case of aluminum fluoride.

The invention catalyst which has been obtained as above described can be molded into tablet or other suitable forms. In addition, this catalyst has the property of maintaining a high catalytic activity over a prolonged period of time such as is not possible of obtaining in the disproportioiation of toluene when the other binding agents have been used.

The molding of this catalyst is carried out by the conventional molding technique using either a tablet machine or an extruder. When the molding is to be performed by a tablet machine, the hydrogenated natural mordenite that is to be mixed with the aforesaid hydrogenated synthetic mordenite is that of granular form passing 14–150 mesh, and preferably 20–60 mesh. This molding material is molded by means of a conventional tablet machine at a molding pressure of 500–20,000 kg./cm.$^2$, and preferably 4000–10,000 kg./cm.$^2$, followed by calcining at 450–650° C., and preferably 520–580° C. The so obtained tablets are used as the catalyst.

When the molding is to be carried out using an extruder, the hydrogenated natural mordenite of finely divided form of smaller than 100 mesh, and preferably smaller than 200 mesh, is mixed with the aforesaid hydrogenated synthetic mordenite in an amount of at least 45 weight percent, and preferably 50–70 weight percent. Water is then added to this mordenite mixture in an amount up to about equal to that by volume of the mixture to render the mixture into a paste, which is molded using a conventional extruder, followed by cutting into suitable lengths, then drying at 100–200° C. and thereafter calcining at 450–650° C., and preferably 520–580° C. The so obtained product is used as the catalyst.

As regards the dealkalization treatment, it goes without saying that this can be carried out (a) separately on the synthetic and natural mordenites before the molding operation, (b) after mixing the synthetic and natural mordenites but before the molding operation, and (c) after the molding operation. In carrying out the disproportionation of toluene using this catalyst, the customary disproportionation conditions are all applicable but, generally speaking, the reaction can be carried out with much milder conditions than in the case of the conventional methods. In this case, a reaction temperature of 300–650° C. will do, preferred being 380–550° C., and still more preferred being 410–520° C.

There is no particular restriction as to the amount of the hydrogen that is added with respect to the toluene, and a toluene:hydrogen mole ratio of 1:50 or less is sufficient, a range between 1:8 and 1:20 being particularly preferred. As the disproportionation activity of the invention catalyst is high, the reaction proceeds even under normal pressure, but commercially it is preferred to operate under superatmospheric pressures, a pressure of less than 50 atmospheres, and particularly ca. 30 atmospheres, being suitable. While there is no particular restriction as to the reaction time factor-$W/F$ (g. cat. hr./mol toluene), where W is the weight of the catalyst and F is the number of mols of toluene fed per hour, a value of 50–400 is preferred, and a range of 100–200 is especially to be preferred, for obtaining a high conversion rate.

The invention be further described fully by means of the following non-limitative examples.

EXAMPLE 1

(A) Preparation of the hydrogenated mordenites

Synthetic mordenite (finely divided "Na-Zeolon" produced by Norton Company, U.S.A.) was treated with an aqueous solution of 10 weight percent of ammonium chloride for 48 hours at 90–95° C., after which it was thoroughly washed with water, dried for 8 hours at 120–150° C., and calcined at 500° C. for 18 hours to obtain a hydrogenated mordenite. (The degree of dealkaliaztion was 98 mol percent.)

Natural mordenite (mordenite structure content 64 wt. percent) produced in Miyagi Prefecture, Japan was ground and screened to 20–60 mesh. This was submitted to exactly the same treatment as in the case of the synthetic mordenite to obtain a hydrogenated natural mordenite. (The degree of dealkalization was 94 mol percent.)

(B) Preparation of catalyst

To the hydrogenated synthetic mordenite obtained as above described was admixed as a binding agent either the foregoing hydrogenated natural mordenite or other classes of binding agents in varying amounts, following which molding of the several mixtures into 5 mm. x 5 mm. diameter tablets were attempted using a conventional tablet machine and a molding pressure of about 6000 kg./cm.$^2$. The ease or difficulty of molding and the results obtained when the disproportionation of toluene was carried out using the so obtained molded catalysts are shown in Table I.

TABLE I

| Binding agent | Amount of molding assistant added (wt. percent) | | | | | |
|---|---|---|---|---|---|---|
| | 5 | 20 | 40 | 60 | 80 | 100 |
| Kaolin, 20–100 mesh | X | X | X | Δ (21) | O | O |
| Alumina, 20–100 mesh | X | X | O (28) | O (20) | O (12) | O |
| Silica, 20–100 mesh | X | X | Δ | O (17) | O | O |
| Hydrogenated natural mordenite | X | X | Δ (38) | O (36) | O (34) | O (30) |

NOTE:
1. The symbols used in the table have the following meanings:
   X Indicates that molding was impossible (which means the case where a pellet could be formed but it was deformed into powder under the reaction).
   Δ Indicates that molding was difficult.
   O Indicates the molding was easy.
2. The numbers enclosed by the parentheses in the table show the mol percent formed of benzene plus xylene based on the toluene with a reaction time of 2–6 hours under the following reaction conditions:
   Catalyst_____grams__ 12.8
   Ratio of toluene flow_____g./hr__ 23.5
   W/F (time factor)_____g-cat. hr./g.-mol__ 50
   Hydrogen/toluene_____mole ratio__ 10
   Rate of hydrogen flow_____liter/hr__ 60
   Pressure_____kg./cm.$^2$__ 30
   Temperature_____° C__ 410

When only finely divided graphite, starch or aluminum stearate usually used as binding agents, were added, molding was not possible. However, the addition of a small quantity of these substances as a lubricant after addition of the hydrogenated natural mordenite was effective in improving the moldability.

EXAMPLE 2

The disproportionation of toluene was carried out over a prolonged period of time under the reaction conditions indicated in Example 1, using the following catalysts.

Catalyst (1)

A wet-molded commercial product 5 mm. x 1.7 mm. dia., "Zeolon-H" of Norton Company, U.S.A. [a hydrogenated synthetic mordenite (degree of dealkalization at least 90 mol percent); binding agent unknown].

Catalyst (2)

A dry-molded product 5 mm. x 5 mm. dia. of a hydrogenated product of natural mordenite produced in Miyagi Prefecture, Japan, as prepared in Example 1 (mordenite structure content 64 wt. percent).

Catalyst (3)

A dry-molded product 5 mm. x 5 mm. dia. of a mixture of hydrogenated synthetic and natural mordenites (mordenite structure content 82 wt. percent, degree of dealkalization as a whole of 96 mol percent obtained by mixing 50 wt. percent "Na-Zeolon" (powder) used in Example 1 and 50 wt. percent of the natural mordenite (20–60 mesh) used in Example 1, followed by treating in accordance with the preparation method described therein.

Catalyst (4)

A dry-molded product 5 mm. x 5 mm. dia. (mordenite structure content 60 wt. percent of a mixture of 60 wt. percent of a hydrogenated synthetic mordenite (powder) prepared in Example 1 and 40 wt. percent of 20–100 mesh alumina.

The results obtained are shown in Table II.

TABLE II.—DISPROPORTIONATION ACTIVITY AND CHANGE WITH PASSAGE OF TIME

| Catalyst | Disproportionation activity (Mol percent formed of benzene plus xylene based on amount of toluene fed) | | | |
|---|---|---|---|---|
| | (1) | (2) | (3) | (4) |
| Reaction time (hr.): | | | | |
| 2–8 | 38.2 | 30.5 | 36.5 | 29.1 |
| 4–8 | 32.6 | 29.9 | 36.1 | 27.6 |
| 8–12 | 29.7 | 29.9 | 35.9 | 27.2 |
| 12–16 | 26.5 | 29.8 | 35.9 | 26.9 |
| 16–20 | 24.1 | 29.6 | 35.8 | 26.4 |
| 40–50 | 20.8 | 29.2 | 35.6 | 24.8 |
| 90–100 | | 28.4 | 34.8 | |
| 100–200 | | 28.0 | 34.2 | |

Note.—Catalysts (1), (2), (3), and (4) were calcined in air for 12 hours at 520–560° C. after molding.

As apparent from the results presented in Table II, catalyst (3) of the present invention not only demonstrated high activity but also small change with the passage of time. Catalyst (2) which was prepared from a good natural mordenite demonstrated as small a change with the passage of time as catalyst (3), though the activity of catalyst (2) is somewhat inferior to that of catalyst (3).

EXAMPLE 3

The following three classes of ammonium salts of natural mordenite were prepared, which in each case were obtained as 20–150 mesh granules.

(i) Ammonium salt of natural mordenite produced in Miyagi Prefecture, Japan (mordenite structure content 64%, degree of dealkalization 94 mol percent).

(ii) Ammonium salt of natural mordenite produced in Fukushima Prefecture, Japan (mordenite structure content 45%, degree of dealkalization 93 mol percent).

(iii) Ammonium salt of natural mordenite produced in Nova Scotia, Canada (mordenite structure content 22%, degree of dealkalization 92 mol percent).

Each of the foregoing ammonium salts of natural mordenite was mixture with an ammonium salt of synthetic mordenite, which was prepared exactly as in Example 1, the ratio of mix of the synthetic mordenite to natural mordenite being 40:60 in the case of the salts (i) and (ii) and 50:50 in the case of salt (iii). The mixtures were then molded and converted to hydrogenated mordenites to obtain catalysts (5), (6) and (7) by a method comprising incorporating the foregoing mixtures with 1.2% of aluminum stearate as a lubricant, then molding the mixtures into tablets 4 mm. x 5 mm. dia. with a molding pressure of about 10,000 kg./cm.$^2$, and thereafter calcining the tablets for 12 hours at 540° C. to obtain the catalyst of the invention.

On the other hand, as control, a mixture of 40 parts of the aforesaid ammonium salt of synthetic mordenite and 60 parts of the ammonium salt of natural mordenite indicated under (iii), above, was prepared, after which this mixture was molded and treated under identical conditions as hereinbefore indicated to obtain a catalyst whose mordenite structure content was less than 60%. These catalysts were used to carry out the disproportionation of toluene under identical conditions as in Example 1 with the results shown in Table III. There was practically no change in the catalytic activity of the catalysts (5), (6) and (7) and control catalyst (1) even after 50 hours of operation.

TABLE III

| Catalyst | Mordenite structure content, percent | Activity (B+X), mol percent |
|---|---|---|
| (5) | 78 | 55 |
| (6) | 67 | 33 |
| (7) | 61 | 31 |
| Control 1 | 53 | 23 |

EXAMPLE 4

The four classes of binding agents indicated below were mixed with the ammonium salt of synthetic mordenite prepared in Example 1 in a mixture ratio of the binding agent to the salt of synthetic mordenite of 60:40 to obtain catalysts (8) and (9), and control catalysts (2) and (3), the method of preparation comprising adding water to the mixtures to render same into a pasty state, following which the pasty mixtures were molded into pellets 5 mm. x 2 mm. dia., using an extruder, followed by drying at 150° C. and further calcining for 24 hours at 520–540° C.

Catalyst:                              Binding agent used (8) _____ Ammonium salt of natural mordenite produced in Miyagi Prefecture, Japan of particle size smaller than 150 mesh (mordenite structure content 64%).

(9) _____ Ammonium salt of natural mordenite produced in Fukushima Prefecture, Japan of particle size smaller than 150 mesh (mordenite structure content 45%).

Control 2 _____ Kaolin of particle size smaller than 200 mesh produced by Kanto Chemical Company, Japan.

Control 3 _____ Alumina sol produced by Nissan Chemical Company, Japan.

These catalysts were used in the disproportionation of toluene under identical reaction conditions as in Example 1 with the results shown in Table IV. The values of activity in the table are those measured 6 hours after initiation of the reaction. In the case of catalysts (8) and (9), practically no change was noted in their catalytic activity even after 50 hours of operation. In contrast, the activities of control catalysts (2) and (3) after 50 hours of operation were reduced by 70% as compared with those after 6 hours of operation.

TABLE IV

| Catalyst | Mordenite structure content, percent | Activity (B+X), mol percent | X/B, mole ratio |
|---|---|---|---|
| (8) | 79 | 37 | 0.82 |
| (9) | 65 | 31 | 0.85 |
| Control 2 | 40 | 22 | 0.89 |
| Control 3 | 42 | 19 | 0.91 |

EXAMPLE 5

The disproportionation of toluene was conducted with the use of the following three classes of catalysts, respectively, under the same conditions as in Example 1 except that the amount of the catalyst was doubled (namely, 25.6 g. of the catalyst with W/F being 100 g.-cat. hr./g. mol). The results are shown in Table V.

Catalyst (10)

Catalyst (3) prepared in Example 2 was further calcined at 520° C. for 18 hours to form a catalyst having an average strength of 138 kg./cm.$^2$, which strength was sufficient for the industrial use.

Control catalyst (4)

A mixture consisting of 82 weight percent of the hydrogenated synthetic mordenite prepared in Example 1 and 18 weight percent of granular silica obtained by drying acidic colloidal silica (Showtex-O, product of Nissan Chemical Company, Japan), calcining it at 500° C. and grinding it to 20–60 meshes, was molded into 5 mm. x 5 mm. diameter tablets by means of a tablet molding machine, followed by calcination at 520° C. for 18 hours. The resulting pellet had an average strength of 32 kg./cm.$^2$, which strength was not sufficient for the industrial use but somehow applicable to the laboratory use.

Control catalyst (5) (blank)

The same acidic colliodal silica as used in the preparation of control catalyst (4) was calcined at 500° C., ground to 6–20 meshes and further calcined at 520° C. for 18 hours. The resulting granular silica was formed into a catalyst.

TABLE V.—DISPROPORTIONATION ACTIVITY AND ITS CHANGE WITH PASSAGE OF TIME

|  | Catalyst | Control | |
|---|---|---|---|
|  | (10) | (4) | (5) |
| Mordenite structure content, percent | 82 | 82 | 0 |
| Reaction hours: | | | |
| 2–6: | | | |
| Benzene plus xylene, mol percent | 45 | 43 | 0 |
| Cracking of aromatic rings (ringloss)*, mol percent | 1.21 | 2.58 | 0.23 |
| 20–24: | | | |
| Benzene plus xylene, mol percent | 43 | 38 | 0 |
| Cracking of aromatic rings (ringloss)*, mol percent | 1.01 | 2.07 | 0.21 |

*Values of the cracking of aromatic rings (ringloss) were calculated from the methane-pentane concentration measured by analyzing the off-gas of the stabilizer.

What is claimed is:

1. A shaped catalyst for the fixed bed disproportionation of toluene consisting essentially of the binary mixture of not more than 55% by weight of a hydrogenated synthetic mordenite and at least 45% by weight of a hydrogenated natural mordenite, the degree of dealkalization of each of said hydrogenated synthetic and natural mordenites being at least 50 mol percent, the content of the mordenite structure being at least 60% by weight, each percentage by weight being based on the total weight of the catalyst.

2. A catalyst according to claim 1, wherein the content of the mordenite structure is 60–90% by weight.

3. A catalyst according to claim 1, wherein the content of the hydrogenated natural mordenite in the catalyst is 50–80% by weight.

4. A catalyst according to claim 1 wherein the degree of dealkalization of each of said hydrogenated synthetic and natural mordenites are at least 80 mol percent.

5. A catalyst according to claim 1 obtained by mixing a finely divided hydrogenated synthetic mordenite with a 14–150 mesh hydrogenated natural mordenite and molding the resulting mixture with a tablet machine.

6. A catalyst according to claim 1 obtained by mixing an equal volume, at the largest, of water with a mixture consisting of a finely divided hydrogenated synthetic mordenite and a finely divided hydrogenated natural mordenite, the particle size of said hydrogenated natural mordenite being smaller than 100 mesh, to render the mixture pasty and thereafter molding said mixture with an extruder.

7. A catalyst according to claim 1 wherein the catalyst is calcined at 450–650° C. subsequent to its molding.

8. A process for conducting the disproportionation of toluene by contacting the catalyst of claim 1 with toluene and hydrogen at 300–650° C.

References Cited

UNITED STATES PATENTS

| 2,973,327 | 2/1961 | Mitchell et al. | 252—449 |
| 3,158,579 | 11/1964 | Pollitzer et al. | 252—455 |
| 3,234,147 | 2/1966 | Drost et al. | 252—455 |
| 3,239,471 | 3/1966 | Chin et al. | 252—455 |
| 3,250,728 | 5/1966 | Miale et al. | 252—455 |
| 3,281,483 | 10/1966 | Benesi et al. | 260—672 |
| 3,323,876 | 6/1967 | Arey et al. | 252—455 X |
| 3,326,818 | 6/1967 | Gladrow et al. | 252—455 |

DELBERT E. GANTZ, Primary Examiner

G. E. SCHMITKONS, Assistant Examiner

U.S. Cl. X.R.

252—455